(12) United States Patent
Wang et al.

(10) Patent No.: US 11,995,117 B2
(45) Date of Patent: May 28, 2024

(54) THEME CLASSIFICATION METHOD BASED ON MULTIMODALITY, DEVICE, AND STORAGE MEDIUM

(71) Applicant: BEIJING BAIDU NETCOM SCIENCE AND TECHNOLOGY CO., LTD., Beijing (CN)

(72) Inventors: Qi Wang, Beijing (CN); Zhifan Feng, Beijing (CN); Zhijie Liu, Beijing (CN); Chunguang Chai, Beijing (CN); Yong Zhu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 579 days.

(21) Appl. No.: 17/069,410

(22) Filed: Oct. 13, 2020

(65) Prior Publication Data

US 2021/0256051 A1   Aug. 19, 2021

(30) Foreign Application Priority Data

Feb. 14, 2020   (CN) .......................... 202010093770.0

(51) Int. Cl.
*G06F 16/00* (2019.01)
*G06F 16/45* (2019.01)

(52) U.S. Cl.
CPC .................................. *G06F 16/45* (2019.01)

(58) Field of Classification Search
CPC ....................................................... G06F 16/45
See application file for complete search history.

(56) References Cited

U.S. PATENT DOCUMENTS

| 6,961,954 | B1 * | 11/2005 | Maybury | ............... | G11B 27/28 |
| | | | | | 725/53 |
| 2005/0044091 | A1 * | 2/2005 | Nakamura | ............... | G06F 16/58 |
| 2015/0082349 | A1 | 3/2015 | Ishtiaq et al. | | |
| 2016/0004911 | A1 | 1/2016 | Cheng et al. | | |

(Continued)

FOREIGN PATENT DOCUMENTS

| CN | 102831234 B | * | 4/2015 |
| CN | 105843931 A | | 8/2016 |

(Continued)

OTHER PUBLICATIONS

Ntarlagiannis, V., "Search Report for EP application 20202345.3", dated Mar. 15, 2021, EPO, Germany.

(Continued)

*Primary Examiner* — Syed H Hasan
(74) *Attorney, Agent, or Firm* — Bridgeway IP Law Group, PLLC; Jihun Kim (57) ABSTRACT

A theme classification method based on multimodality is related to a field of a knowledge map. The method includes obtaining text information and non-text information of an object to be classified. The non-text information includes at least one of visual information and audio information. The method also includes determining an entity set of the text information based on a pre-established knowledge base, and then extracting a text feature of the object based on the text information and the entity set. The method also includes determining a theme classification of the object based on the text feature and a non-text feature of the object.

18 Claims, 5 Drawing Sheets

(56) References Cited

U.S. PATENT DOCUMENTS

| | | | |
|---|---|---|---|
| 2017/0185912 A1* | 6/2017 | Friggeri | H04L 67/55 |
| 2017/0277668 A1* | 9/2017 | Luo | G06F 16/345 |
| 2018/0121533 A1 | 5/2018 | Magnani et al. | |
| 2019/0005121 A1* | 1/2019 | Chi | G06F 16/313 |
| 2019/0045194 A1* | 2/2019 | Zavesky | H04N 19/179 |
| 2020/0192935 A1* | 6/2020 | Ambwani | G06F 16/7844 |
| 2020/0195983 A1* | 6/2020 | Chao | G06F 16/7328 |

FOREIGN PATENT DOCUMENTS

| | | | |
|---|---|---|---|
| CN | 109933688 A | | 6/2019 |
| CN | 110083716 A | | 8/2019 |
| JP | 2009060490 A | | 3/2009 |
| JP | 2016218652 A | | 12/2016 |
| JP | 2019208103 A | | 12/2019 |
| WO | 2018/197639 A1 | | 11/2018 |

OTHER PUBLICATIONS

Tagawa, Yasuhiro, "Search Report for JP application 2021-020378", dated Jan. 18, 2022, JPO, Japan.

Liu Zhenli, "Office Action for CN Application No. 202010093770.0", dated Jan. 5, 2023, CNIPA, China.

\* cited by examiner

THEME CLASSIFICATION METHOD BASED ON MULTIMODALITY, DEVICE, AND STORAGE MEDIUM

CROSS REFERENCE TO RELATED APPLICATIONS

This application is based on and claims priority to Chinese patent applications Serial No. 202010093770.0 filed on Feb. 14, 2020, the entire contents of which are incorporated herein by reference.

FIELD

Embodiments of the present disclosure generally relate to a computer field, and more particularly to a field of a knowledge map.

BACKGROUND

With increasing development of mobile Internet, network resources (such as videos, speeches, images, etc.) become more and more popular. For example, the video may be classified as a long video, a short video or a small video based on a time length. The long video refers to a video with a long duration and mainly with content of a film and television program, which is generally photographed by a professional film and television company. The short video refers to a video with a short duration and rich materials, which is generally not photographed by a professional or semi-professional team of a film and television company. The small video is a video generally with a duration within 1 minute (such as, 15 seconds), mainly produced by an individual user, and usually related to daily life of the individual user.

For an organization with large multimedia databases (such as the video), there generally needs to determine a theme classification of the video. The theme classification makes it easier for the user to search for required content, and is also convenient for video distribution and personalized recommendation for the user. Generally, the video may be classified based on a title and text introduction of the video, and also be classified based on detailed content of the video.

SUMMARY

According to embodiments of the present disclosure, a theme classification method based on multimodality, a device and a storage medium are provided.

In a first aspect of the present disclosure, there is provided a theme classification method based on multimodality. The method includes obtaining text information and non-text information of an object to be classified, the non-text information including at least one of visual information and audio information; determining an entity set of the text information based on a pre-established knowledge base; extracting a text feature of the object based on the text information and the entity set; extracting a non-text feature of the object based on the non-text information; and determining a theme classification of the object based on the text feature and the non-text feature of the object.

In a second aspect of the present disclosure, there is provided a theme classification apparatus based on multimodality. The apparatus includes: a multimodality information obtaining module, an entity extracting module, a text feature extracting module, and a theme classification determining module. The multimodality information obtaining module is configured to obtain text information and non-text information of an object to be classified. The non-text information includes at least one of visual information and audio information. The entity extracting module is configured to determine an entity set of the text information based on a pre-established knowledge base. The text feature extracting module is configured to extract a text feature of the object based on the text information and the entity set. The theme classification determining module is configured to determine a theme classification of the object based on the text feature and a non-text feature of the object. The non-text feature is extracted based on the non-text information.

In a third aspect of the present disclosure, an electronic device is provided. The electronic device includes one or more processors and a storage device. The storage device is configured to store one or more programs. When the one or more programs are executed by the one or more processors, the electronic device is caused to implement the method or the procedure according to the first aspect of the present disclosure.

In a fourth aspect of the present disclosure, there is provided a computer readable medium having a computer program stored thereon. When the computer program is executed by a processor, the method or procedure according to embodiments of the present disclosure is implemented.

It should be understood that, descriptions in Summary of the present disclosure are not intended to limit an essential or important feature in embodiments of the present disclosure, and are also not construed to limit the scope of the present disclosure. Other features of the present disclosure will be easily understood by following descriptions.

BRIEF DESCRIPTION OF THE DRAWINGS

The above and other features, advantages and aspects of respective embodiments of the present disclosure will become more apparent with reference to accompanying drawings and following detailed illustrations. In the accompanying drawings, the same or similar numeral references represent the same or similar elements, in which.

DETAILED DESCRIPTION

Description will be made in detail below to embodiments of the present disclosure with reference to accompanying drawings. Some embodiments of the present disclosure are illustrated in the accompanying drawings. It should be understood that, the present disclosure may be implemented in various ways, but not be construed as a limitation of the embodiments herein. On the contrary, those embodiments provided are merely for a more thorough and complete understanding of the present disclosure. It should be understood that, the accompanying drawings and the embodiments of the present disclosure are merely for exemplary purposes, but is not meant to limit the protection scope of the present disclosure.

In the description of embodiments of the present disclosure, the terms "includes" and its equivalents like should be understood as an open "include", that is, "include but not limited to". The terms "based on" should be understood as "based at least in part on". The terms "an embodiment" or "the embodiment" should be understood as "at least one embodiment". Other explicit and implicit definitions may also be included below.

Although some embodiments of the present disclosure describe a theme classification method based on multimodality of the present disclosure by means of examples with a video as an object, an object such as a speech and an image may also be used in combination with the theme classification method of the present disclosure.

For example, in order to facilitate managing, searching or recommending the video, the video generally needs to be classified. There are two conventional methods for classifying the video. The first method is manual marking. However, the manual marking is not only costly, time-consuming, prone to error, and requires regular maintenance, but also may not be performed on a large scale. The other method is machine learning. For example, a machine learning model performs classification based on text information or visual information of the video. However, there is generally a less amount of information in single modality, such that a classification result is not accurate, and an application requirement in a complex scene is difficult to be met. Some improved techniques try to use multimodality information for theme classification of the video. However, a good classification result may not be achieved by merely using the multimodality information.

For this, embodiments of the present disclosure provide a theme classification method based on multimodality of a knowledge base. With the method, knowledge in the knowledge base is combined with the multimodality information, to perform the theme classification based on the multimodality. According to embodiments of the disclosure, an entity linking for text based on the knowledge base is introduced in a feature extraction, and a linked entity is considered when the feature extraction is performed on the text. Therefore, in embodiments of the present disclosure, content of an object to be classified may be better understood, thereby obtaining a more accurate theme classification result. The theme classification based on the multimodality may make better use of the multimodality information. Meanwhile, more reference information may be brought for the theme classification by means of the entity linking of the knowledge base, thereby obtaining a better effect for the theme classification.

Embodiments of the present disclosure may be applied to theme classification or tag generation for the object, to facilitate understanding and searching of the object. In addition, embodiments of the present disclosure may also be used for object distribution and recommendation, and be applicable to a scene of a cold boot of the object recommendation. Some exemplary embodiments of the present disclosure may be described in detail with reference to FIGS. 1-8.

Figure 1:
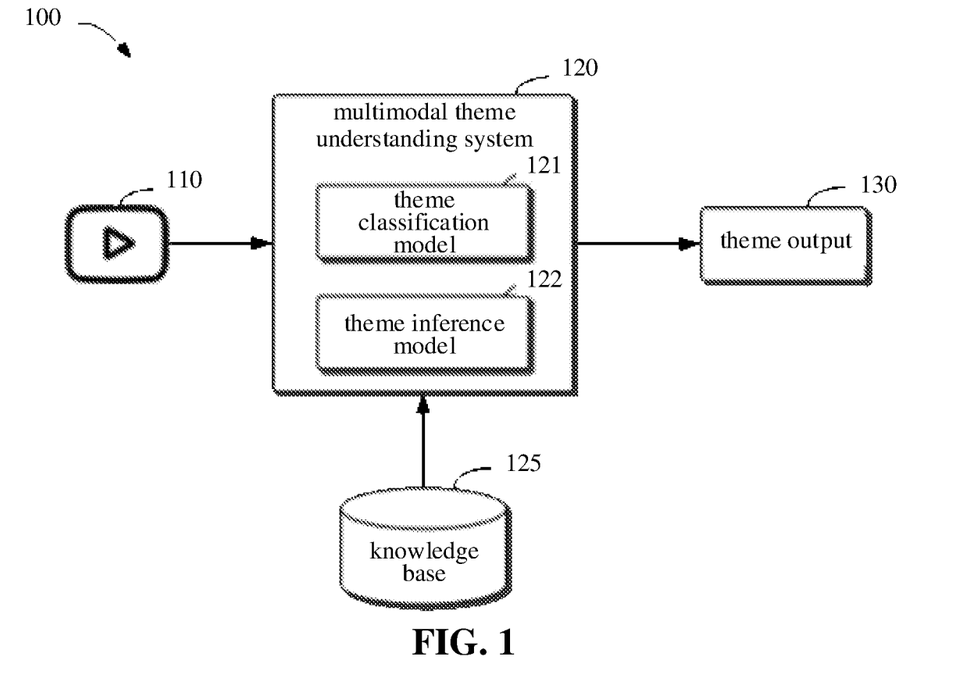
FIG. 1 is a schematic diagram illustrating an exemplary scene where a theme of an object is determined according to an embodiment of the present disclosure.

FIG. 1 is a schematic diagram illustrating an exemplary scene 100 where a theme of an object is determined according to an embodiment of the present disclosure, in which a video is taken as the object takes in an example, but the object may also be a speech, an image, etc. As illustrated in FIG. 1, a theme output 130 corresponding to a video 110 may be obtained by inputting the video 110 into a multimodal theme understanding system 120. The multimodal theme understanding system 120 may include a theme classification model 121 and a theme inference model 122. The video 110 may be a video in various types, such as a long video, a short video, a small video, and the like. Although both the theme classification model 121 and the theme inference model 122 are illustrated in FIG. 1, the multimodal theme understanding system 120 may not include the theme inference model 122 in some embodiments.

The theme classification model 121 may classify a closed theme by using multimodality information (such as visual information, audio information, text information, etc.) of the video 110, and the closed theme may be manually arranged, or automatically extracted and generated by a computer. The theme inference model 122 may determine a theme inference of the video based on the text information of the video 110. The theme inference may use a finer-grained and open theme, to generate a tag of the video. Therefore, a merged theme output 130 may be obtained by merging a theme classification result and a theme inference result. Therefore, the multimodal theme understanding system 120 according to embodiments of the present disclosure may be very complete, which is suitable for both a closed theme classification and an open theme annotation.

The theme classification model 121 and the theme inference model 122 may realize the theme classification of the theme classification model 121 or the theme inference of the theme inference model 122 by utilizing the knowledge in the knowledge base 125. The knowledge base 125 may store some entities related to the video and theme types corresponding to these entities.

Figure 2:
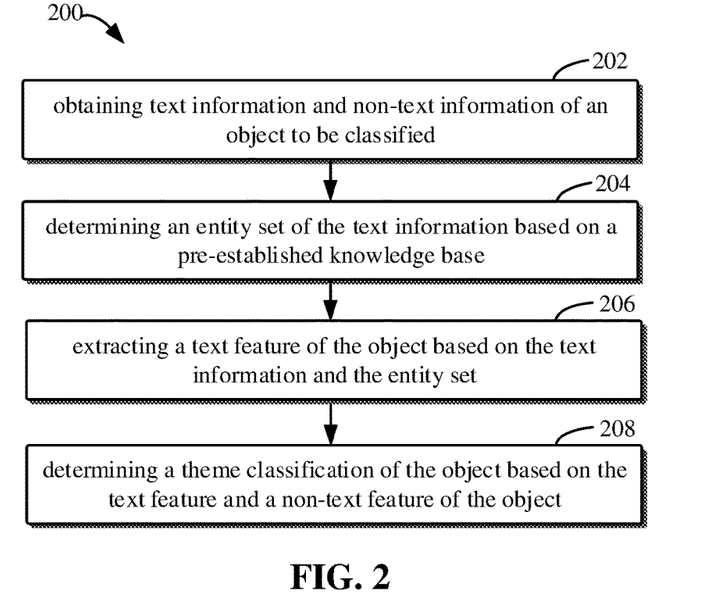
FIG. 2 is a flow chart illustrating a theme classification method based on multimodality according to an embodiment of the present disclosure.

FIG. 2 is a flow chart illustrating a theme classification method 200 based on multimodality according to an embodiment of the present disclosure. The method 200 may be executed by the theme classification model 121 described in FIG. 1.

At block 202, text information and non-text information of an object are obtained, in which the non-text information includes at least one of visual information and audio information. For the video, the non-text information includes the visual information and the audio information. For an audio, the non-text information includes the audio information. For an image, the non-text information includes the visual information. For example, for the inputted video 110, the theme classification model 121 may extract multimodality information of the video 110, such as the visual information, the audio information and the text information. The visual information may include video information and image frames, and the text information may include characters and a text recognized from the image and the speech. Every source or form of information may be referred as a modality. A media of information includes a speech, vision, a character and so on, each of which may be referred as a modality. Multimodal theme understanding may implement an ability of processing and understanding the multimodality information by the machine learning.

At block 204, an entity set of the text information is determined based on a pre-established knowledge base For example, the theme classification model 121 may link one or more entities involved in the text based on the pre-established knowledge base 125 for the video. By performing entity linking on the text information, some related video information involved in the text may be extracted.

At block 206, a text feature of the object is extracted based on the text information and the entity set. The theme classification model 121 considers both the text information of the video and the entity set extracted from the text information when extracting the text feature of the video, thereby obtaining more accurate text information.

At block 208, a theme classification of the object is determined based on the text feature and a non-text feature of the object. The non-text feature may include at least one of a visual feature and an audio feature. The visual feature is extracted based on the visual information. The audio feature is extracted based on the audio information. The theme classification model 121 determines the theme classification of the video based on a plurality of features of the multimodality information.

Therefore, with the method 200 according to embodiments of the present disclosure, during performing the theme classification on the object based on the multimodality information, the entity linking for text based on the knowledge base is introduced in the feature extraction, and the linked entity is considered during the feature extraction. Therefore, with embodiments of the present disclosure, content of an object to be classified may be better understood, thereby obtaining a more accurate theme classification result.

With embodiments of the present disclosure, the theme classification of the object is performed in an automatic way, such that the procedure is efficient and the cost is low. In addition, embodiments of the present disclosure make full use of the multimodality information, which may merge information in different modalities, combine the features of different modalities, and may use the information in different modalities for verification and alignment. Meanwhile, the multimodality information may be better understood in combination with the knowledge base, such that the theme understanding based on the multimodality may be performed more comprehensively and deeply.

Figure 3:
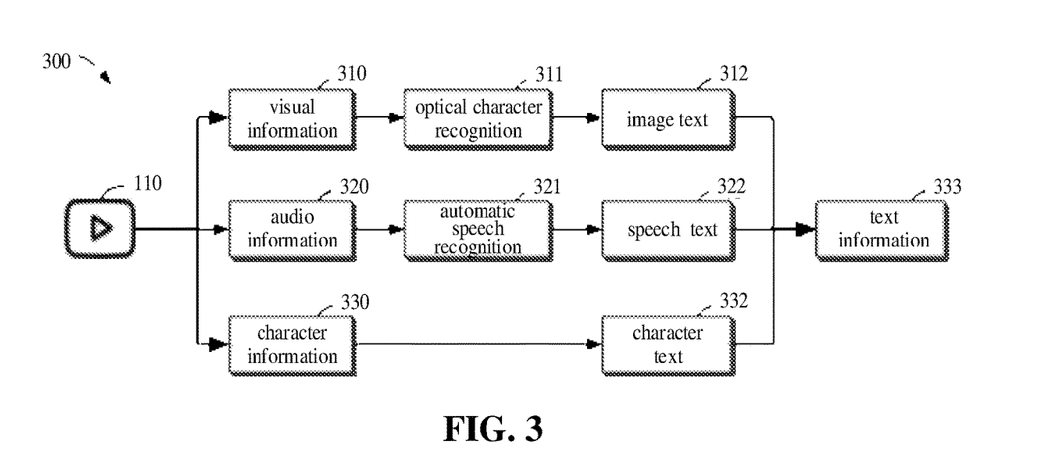
FIG. 3 is a schematic diagram illustrating a process for obtaining text information of a video according to an embodiment of the present disclosure.

FIG. 3 is a schematic diagram illustrating a process 300 for obtaining text information of a video according to an embodiment of the present disclosure. As illustrated in FIG. 3, multimodality information of an inputted video 110 is extracted, which includes visual information 310 (which may include video information and image frames, such as a cover frame of the video, etc.), audio information 320 and character information 330. The character information 330 may include a title, related description or an abstract, user comments, bullet screens and the like of the video 110.

At block 311, optical character recognition (OCR) may be performed on the visual information 310, to extract an image text 312. At block 321, automatic speech recognition (ASR) may be performed on the audio information 320, to extract a speech text 322. A character text 332 may be obtained based on the character information 330. Then, the image text 312, the speech text 322 and the character text 332 obtained from these different sources may be merged to obtain text information 333 of the video. In this way, richer text information of the video may be obtained, thereby improving an accuracy of the theme classification.

Figure 4:
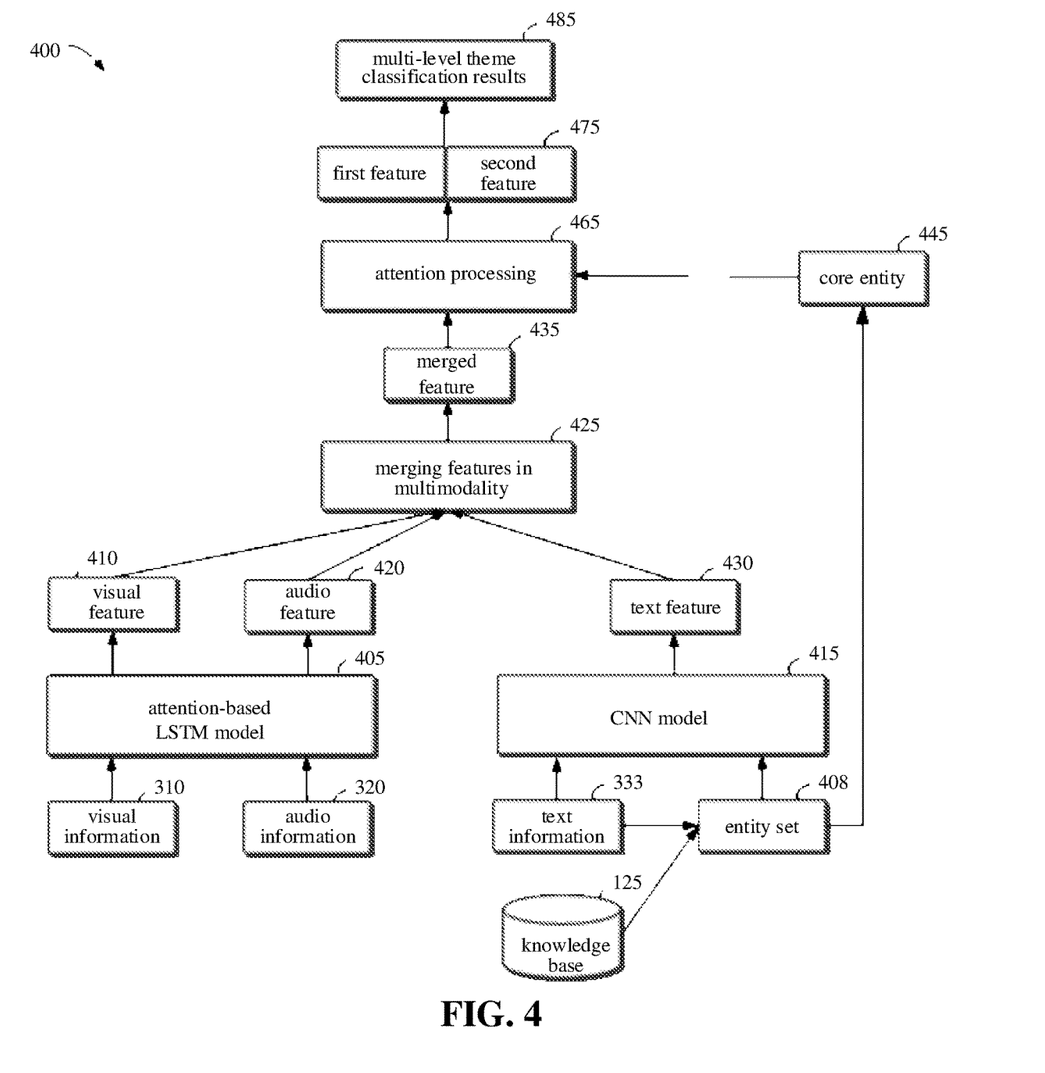
FIG. 4 is a schematic diagram illustrating a process for determining multi-level theme classification results of a video according to an embodiment of the present disclosure.

FIG. 4 is a schematic diagram illustrating a process 400 for determining multi-level theme classification results of a video according to an embodiment of the present disclosure. It should be understood that, the process 400 in FIG. 4 may be an exemplary implementation process of the theme classification model 121 in FIG. 1. As illustrated in FIG. 4, a visual feature 410, an audio feature 420, and a text feature 430 may be respectively extracted by an attention-based long short-term memory (LSTM) model 405 and a convolutional neural network (CNN) model 415 (such as, RCNN model).

The attention-based LSTM model 405 may be a LSTM based on an attention mechanism, which performs operations such as convolution feature calculation and feature aggregation. The attention-based LSTM model 405 generates the visual feature 410 of visual information 310 by the OCR, the face recognition and the feature extraction, and generates the audio feature 420 of audio information 320 by the ASR and the feature extraction.

The CNN model 415 may extract a word embedding vector and a character embedding vector by a pre-trained language model, may also perform entity linking on a text to link out an entity in the text, and may obtain an entity embedding vector by a pre-trained vector generation model of the entity, and then merge the above embedding vectors. In addition, the CNN model 415 may also involve procedures such as location embedding and pre-trained entity embedding, and extract a low-latitude semantic feature by a deep neural network to obtain a text feature 430. For example, an entity set 408 may be extracted from the text information 333 based on a knowledge base 125. Then the CNN model 415 extracts the text feature 430 based on the text information 333 and the entity set 408. With embodiments of the present disclosure, by introducing the entity linking for text based on the knowledge base in the feature extraction and considering the linked entity during the feature extraction performed on the text, content of a video to be classified may be better understood, thereby obtaining a more accurate theme classification result.

In the following, at block 425, a merged feature 435 of the video is obtained by merging the visual feature 410, the audio feature 420, and the text feature 430. For example, the procedure for merging the features may combine information in a plurality of modalities, judge correlations among the plurality of modalities, and perform dimension reduction and processing on the feature information of the plurality of modalities.

Referring to FIG. 4, a core entity 445 may be extracted from the entity set 408, and then a theme type corresponding to the core entity 445 may be determined based on the knowledge base 125. For example, the core entity 445 may be obtained by entity linking, and then the theme type may be obtained based on the knowledge map of the video. For example, for a text of a classic fragment in Infernal Affairs)), that is, "it is estimated that Sam never dreamed that he would die in his hand", the extracted core entity 445 may be "Infernal Affairs", and the theme type of the core entity is "movie".

Then, at block 465, an embedding vector of the core entity 445 and an embedding vector of the theme type corresponding to the core entity may be used to perform attention processing on the merged feature 435 (such as, a merged representation h), so as to obtain a first feature V1 and a second feature V2, and the first feature V1 and the second feature V2 are combined or merged, as illustrated in block 475. Based on the first feature V1 and the second feature V2, multi-level theme classification results 485 (such as, a first-level theme classification result, a second-level theme classification result, etc.) may be obtained by using a hierarchical classification technology, which may be performed the classification by limited tags.

Figure 5:
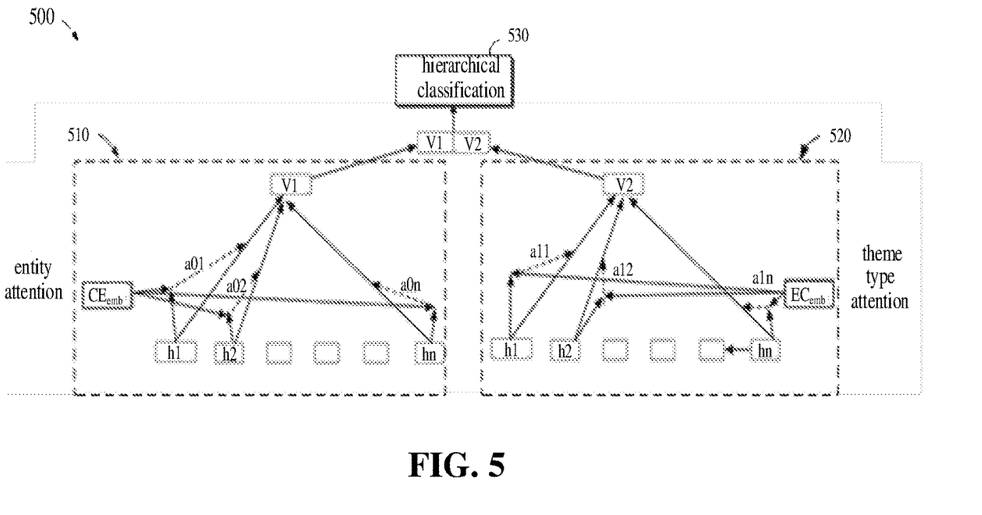
FIG. 5 is a schematic diagram illustrating an example of performing attention processing on a merged feature by using a core entity and a theme type corresponding to the core entity according to an embodiment of the present disclosure.

FIG. 5 is a schematic diagram 500 illustrating an example of performing attention processing on a merged feature by using a core entity and a theme type corresponding to the core entity according to an embodiment of the present disclosure, where, h1, h2 . . . hn represent each component of a vector of the merged feature, $CE_{emb}$ represents a vector of the core entity, and $EC_{emb}$ represents a vector of the theme type to which the core entity belongs. At 510, attention processing is performed on the merged feature h by the vector $CE_{emb}$ of the core entity to generate the first feature V1. At 520, attention processing is performed on the merged feature h by the vector $EC_{emb}$ of the theme type to which the core entity belongs, to generate the second feature V2. At 530, hierarchical classification is performed to obtain a hierarchical theme classification result. Calculation formulas of the attention processing are illustrated by following formulas (1)-(3):

$$a_{ij} = \text{softmax}(h_j \text{Emb}_i), i \in [0,1], j \in [1,n] \quad (1)$$

$$\text{Emb}_0 = CE_{emb}, \text{Emb}_1 = EC_{emb} \quad (2)$$

$$V_t = \Sigma_{j=1}^n a_{ij} h_j, t \in [0,1] \quad (3),$$

where, $a_{ij}$ represents a weight of the core entity or the theme type for each component of the merged feature, $a_{0j}$ represents the weight of the core entity for the $j^{th}$ component in the merged feature h, $a_{1j}$ represents the weight of the theme type for the $j^{th}$ component in the merged feature h.

Therefore, the attention processing is performed on the merged feature by using the core entity and the theme type of the core entity, which may further improve the accuracy of the theme classification.

Figure 6:
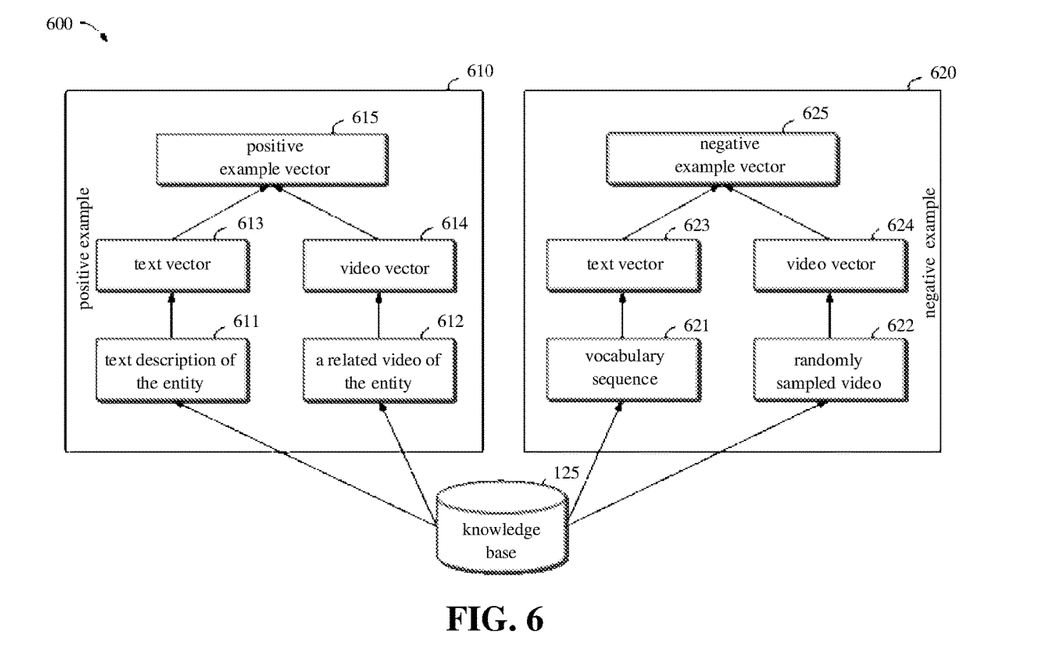
FIG. 6 is a schematic diagram illustrating an example of training a vector generation model of an entity according to an embodiment of the present disclosure.

FIG. 6 is a schematic diagram 600 illustrating an example of training a vector generation model of an entity according to an embodiment of the present disclosure. As illustrated in FIG. 6, a single model may be established for each entity, and a ratio of the number of positive examples to the number of negative examples may be predetermined, such as, 1:10.

At block 610, a procedure for constructing the positive example of the entity is illustrated. Text description 611 of the entity (such as a text abstract and description information) and a related video 612 of the entity are obtained from a knowledge base 125. Then, a text vector 613 is obtained by word2vec, and a video vector 614 is obtained by video2vec, and the text vector 613 and the video vector 614 are merged to obtain a positive example vector 615.

At block 620, a procedure for constructing the negative example of the entity is illustrated. Word frequency information of text abstract information and descriptions of all entities in the knowledge base 125 is counted. A vocabulary sequence 621 of the negative example is obtained by band frequency random sampling. The video 622 is randomly sampled from the knowledge base 125. Then, a text vector 623 is obtained by the word2vec, and a video vector 624 is obtained by the video2vec. The text vector 623 and the video vector 624 are merged to obtain a negative example vector 625.

Then, processing (such as dimension reduction) may be performed on the vector by a neural network, the processed vector is inputted to sigmod, and a final parameter may be determined as an entity vector. In this way, the vector generation model of the entity may be trained by the positive example and the negative example. The generated vector generation model of the entity may be used to generate corresponding entity vectors for the entities, thereby further improving the accuracy of the theme classification.

Figure 7:
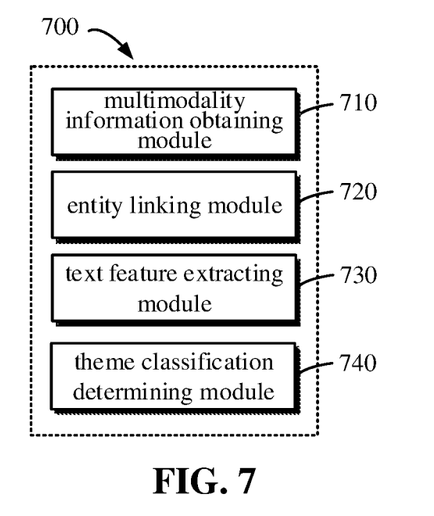
FIG. 7 is a block diagram illustrating a theme classification apparatus based on multimodality according to an embodiment of the present disclosure.

FIG. 7 is a block diagram illustrating a theme classification apparatus 700 based on multimodality according to an embodiment of the present disclosure. As illustrated in FIG. 7, the apparatus 700 includes: a multimodality information obtaining module 710, an entity linking module 720, a text feature extracting module 730, and a theme classification determining module 740.

The multimodality information obtaining module 710 is configured to obtain text information and non-text information of an object to be classified. The non-text information includes at least one of visual information and audio information. The entity linking module 720 is configured to determine an entity set of the text information based on a pre-established knowledge base. The text feature extracting module 730 is configured to extract a text feature of the object based on the text information and the entity set. The theme classification determining module 740 is configured to determine a theme classification of the object based on the text feature and a non-text feature of the object. The non-text feature is extracted based on the non-text information.

In some embodiments, the multimodality information obtaining module 710 includes: an image text obtaining module, a speech text obtaining module, a character text obtaining module, and a text merging module. The image text obtaining module is configured to obtain an image text by performing optical character recognition for the visual information. The speech text obtaining module is configured to obtain a speech text by performing automatic speech recognition for the audio information. The character text obtaining module is configured to obtain a character text based on a title and a bullet screen of the object. The text merging module is configured to obtain the text information by merging the image text, the speech text and the character text.

In some embodiments, the theme classification determining module 740 includes: a feature extracting module, a merged feature obtaining module and a multi-level theme classifications determining module. The feature extracting module is configured to, based on the visual information and the audio information, extract a visual feature and an audio feature by an attention-based long short-term memory network. The merged feature obtaining module is configured to obtain a merged feature of the object by merging the visual feature, the audio feature, and the text feature. The multi-level theme classifications determining module is configured to determine the multi-level theme classifications of the object based on the merged feature.

In some embodiments, the multi-level theme classifications determining module includes: a core entity determining module and a theme type determining module. The core entity determining module is configured to determine a core entity in the entity set. The theme type determining module is configured to determine a theme type corresponding to the core entity based on the knowledge base.

In some embodiments, the multi-level theme classifications determining module further includes: a first feature obtaining module, a second feature obtaining module and a multi-level theme classifications obtaining module. The first feature obtaining module is configured to obtain a first feature by weighting the merged feature using a vector of the core entity. The second feature obtaining module is configured to obtain a second feature by weighting the merged feature using a vector of the theme type. The multi-level theme classifications obtaining module is configured to obtain the multi-level theme classifications of the object based on the first feature and the second feature.

In some embodiments, the apparatus 700 also includes a training module. The training module is configured to, for each entity, obtain a positive example vector based on a text description for the entity and an object related to the entity in the knowledge base; obtain a negative example vector based on a randomly sampled text and a randomly sampled object; and train a vector generation model of the entity based on the positive example vectors and the negative example vectors. A ratio of a number of the positive example vectors to a number of the negative example vectors is equal to a predetermined ratio.

In some embodiments, the training module includes: a counting module and a random selecting module. The counting module is configured to count word frequencies of words in the text descriptions of all entities in the knowledge base. The random selecting module is configured to randomly select a word sequence used as the negative example based on the word frequency of each word.

In some embodiments, the apparatus 700 also includes a theme inference determining module and a merged theme determining module. The theme inference determining module is configured to determine a theme inference of the object based on the text information. The merged theme determining module is configured to determine the merged theme of the object based on the theme classification and the theme inference of the object.

Figure 8:
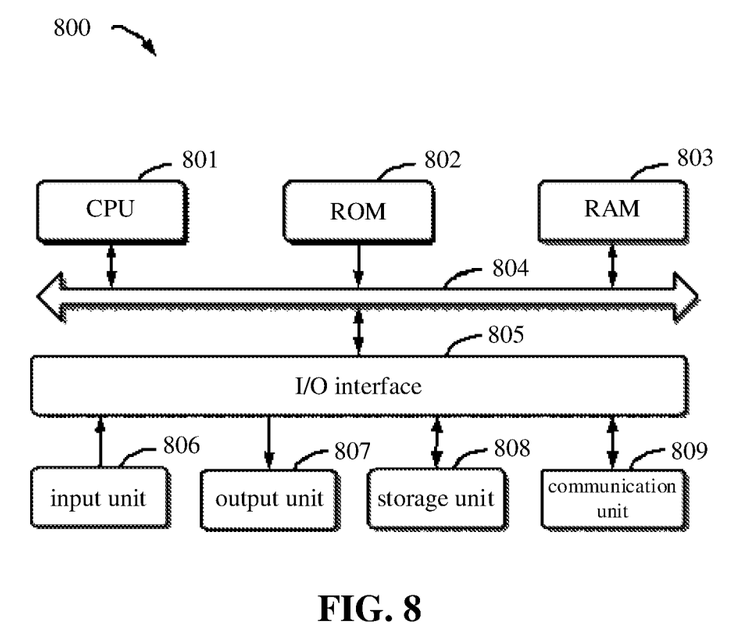
FIG. 8 is a block diagram illustrating an electronic device capable of implementing a plurality of embodiments of the present disclosure.

FIG. 8 is a block diagram illustrating an exemplary device 800 capable of implementing embodiments of the present disclosure. As illustrated in FIG. 8, the device 800 includes a center processing unit (CPU) 801. The CPU 801 may execute various appropriate actions and processes according to computer program instructions stored in a read only memory (ROM) 802 or computer program instructions loaded to a random access memory (RAM) 803 from a storage unit 808. The RAM 803 may also store various programs and date required by the device 800. The CPU 801, the ROM 802, and the RAM 803 may be connected to each other via a bus 804. An input/output (I/O) interface 805 is also connected to the bus 804.

A plurality of components in the device 800 are connected to the I/O interface 805, including: an input unit 806 such as a keyboard and a mouse; an output unit 807 such as various types of displays and loudspeakers; a storage unit 808 such as a magnetic disk and an optical disk; and a communication unit 809, such as a network card, a modem and a wireless communication transceiver. The communication unit 809 allows the device 800 to exchange information/data with other devices over a computer network such as the Internet and/or various telecommunication networks.

The processing unit 801 executes the above-mentioned methods and processes. For example, in some embodiments, these methods and processes may be implemented as a computer software program. The computer software program is tangibly contained a machine readable medium, such as the storage unit 808. In some embodiments, a part or all of the computer programs may be loaded and/or installed on the device 800 through the ROM 802 and/or the communication unit 809. When the computer programs are loaded to the RAM 803 and are executed by the CPU 801, one or more blocks of the above methods described above may be executed. Alternatively, in other embodiments, the CPU 801 may be configured to execute the method according to any one of embodiments of the present disclosure in other appropriate ways (such as, by means of hardware).

The functions described herein may be executed at least partially by one or more hardware logic components. For example, without not limitation, exemplary types of hardware logic components that may be used include: a field programmable gate array (FPGA), an application specific integrated circuit (ASIC), an application specific standard product (ASSP), a system on chip (SOC), a complex programmable logic device (CPLD) and the like.

Program codes for implementing the method of the present disclosure may be written in any combination of one or more programming languages. These program codes may be provided to a processor or a controller of a general purpose computer, a special purpose computer or other programmable data processing device, such that the functions/operations specified in the flowcharts and/or the block diagrams are implemented when these program codes are executed by the processor or the controller. These program codes may execute entirely on a machine, partly on a machine, partially on the machine as a stand-alone software package and partially on a remote machine or entirely on a remote machine or entirely on a server.

In the context of the present disclosure, the machine-readable medium may be a tangible medium that may contain or store a program to be used by or in connection with an instruction execution system, apparatus, or device. The machine-readable medium may be a machine-readable signal medium or a machine-readable storage medium. The machine-readable medium may include, but not limit to, an electronic, magnetic, optical, electromagnetic, infrared, or semiconductor system, apparatus, or device, or any suitable combination of the foregoing. More specific examples of the machine-readable storage medium may include electrical connections based on one or more wires, a portable computer disk, a hard disk, a RAM, a ROM, an erasable programmable read-only memory (EPROM or flash memory), an optical fiber, a portable compact disk read-only memory (CD-ROM), an optical storage, a magnetic storage device, or any suitable combination of the foregoing.

The computer-readable program instructions described herein may be downloaded from the computer-readable storage medium to various computing/processing devices, or downloaded to an external computer or an external storage device through a network, such as the Internet, a local area network, a wide area network, and/or a wireless network. The network may include copper transmission cables, optical fiber transmission, wireless transmission, routers, firewalls, switches, gateway computers and/or edge servers. A network adapter card or a network interface in each computing/processing device receives the computer-readable program instructions from the network and forwards the computer-readable program instructions for storage in the computer-readable storage medium in each computing/processing device.

In addition, although respective operations or steps are depicted in a particular order, it should be understood to require that such operations or steps are executed in the illustrated particular order or in a sequential order, or that all illustrated operations or steps should be executed to achieve the desired result. Multitasking and parallel processing may be advantageous in certain circumstances. Likewise, although several specific implementation details are included in the above discussion, these should not be construed as limitation of the scope of the present disclosure. Certain features described in the context of separate embodiments may also be implemented in combination in a single implementation. On the contrary, various features described in the context of the single implementation may also be implemented in a plurality of implementations, either individually or in any suitable sub-combination.

Although embodiments of the present disclosure has been described in language specific to structural features and/or methodological acts, it should be understood that the subject matter defined in the appended claims is not limited to the specific features or acts described above. Instead, the specific features and acts described above are merely exemplary forms of implementing the claims.

What is claimed is:

1. A computer-implemented theme classification method based on multimodality, comprising:
   extracting, digitally, text information of an object to be classified by using a plurality of computer implemented text-extraction methods, and extracting, digitally, non-text information of the object, wherein the non-text information of the object comprises at least one of visual information and audio information of the object;
   determining, digitally, an entity set of the text information by performing entity linking on the text information based on a pre-established knowledge base, wherein performing entity linking comprises linking one or more entities in the entity set involved in the text based on the pre-established knowledge base;
   extracting a text feature of the object based on the text information and the entity set;
   extracting a non-text feature of the object based on the non-text information; and
   determining a theme classification of the object based on the text feature and the non-text feature of the object,
   wherein the entity set comprises a plurality of entities involved in the text information, and the method further comprises: for each entity in the entity set,
   obtaining a positive example vector based on a text description for the entity and an object related to the entity in the knowledge base;
   obtaining a negative example vector based on a randomly sampled text and a randomly sampled object; and
   training a vector generation model of the entity based on positive example vectors and negative example vectors, wherein a ratio of a number of the positive example vectors to a number of the negative example vectors is equal to a predetermined ratio.

2. The method of claim 1, wherein digitally extracting the text information of the object comprises:
   extracting an image text by performing optical character recognition for the visual information;
   extracting a speech text by performing automatic speech recognition for the audio information;
   extracting a character text based on a title and a bullet screen of the object; and
   merging the image text, the speech text, and the character text into the text information.

3. The method of claim 1, wherein determining the theme classification of the object comprises:
   based on the visual information and the audio information, extracting a visual feature and an audio feature by an attention-based long-short term memory network;
   obtaining a merged feature of the object by merging the visual feature, the audio feature, and the text feature; and
   determining multi-level theme classifications of the object based on the merged feature.

4. The method of claim 3, wherein determining the multi-level theme classifications of the object comprises:
   determining a core entity in the entity set; and
   determining a theme type corresponding to the core entity based on the knowledge base.

5. The method of claim 4, wherein determining the multi-level theme classifications of the object further comprises:
   obtaining a first feature by weighting the merged feature using a vector of the core entity;
   obtaining a second feature by weighting the merged feature using a vector of the theme type; and
   obtaining the multi-level theme classifications of the object based on the first feature and the second feature.

6. The method of claim 1, wherein obtaining the negative example vector comprises:
   counting word frequencies of words in text descriptions of all entities in the entity set in the pre-established knowledge base; and
   randomly selecting a word sequence used as the negative example vector based on the word frequency of each word.

7. The method of claim 1, wherein the method further comprises:
   determining a theme inference of the object based on the text information; and
   determining a merged theme of the object based on the theme classification and the theme inference of the object.

8. An electronic device, comprising:
   one or more processors; and
   a storage device, configured to store one or more programs,
   wherein when the one or more programs are executed by the one or more processors, the electronic device is caused to implement a theme classification method based on multimodality, the method comprising:
   extracting, digitally, text information of an object to be classified by using a plurality of computer implemented text-extraction methods, and extracting, digitally, non-text information of the object, wherein the non-text information comprises at least one of visual information and audio information;
   determining, digitally, an entity set of the text information by performing entity linking on the text information based on a pre-established knowledge base, wherein performing entity linking comprises linking one or more entities involved in the text based on the pre-established knowledge base;
   extracting a text feature of the object based on the text information and the entity set;
   extracting a non-text feature of the object based on the non-text information; and
   determining a theme classification of the object based on the text feature and the non-text feature of the object,
   wherein the entity set comprises a plurality of entities involved in the text information, and the method further comprises: for each entity in the entity set,
   obtaining a positive example vector based on a text description for the entity and an object related to the entity in the knowledge base;
   obtaining a negative example vector based on a randomly sampled text and a randomly sampled object; and
   training a vector generation model of the entity based on positive example vectors and negative example vectors, wherein a ratio of a number of the positive example vectors to a number of the negative example vectors is equal to a predetermined ratio.

9. The electronic device of claim 8, wherein obtaining the text information of the object comprises:
   obtaining an image text by performing optical character recognition for the visual information;
   obtaining a speech text by performing automatic speech recognition for the audio information;
   obtaining a character text based on a title and a bullet screen of the object; and
   obtaining the text information by merging the image text, the speech text, and the character text.

10. The electronic device of claim 8, wherein determining the theme classification of the object comprises:
   based on the visual information and the audio information, extracting a visual feature and an audio feature by an attention-based long-short term memory network;
   obtaining a merged feature of the object by merging the visual feature, the audio feature, and the text feature; and
   determining multi-level theme classifications of the object based on the merged feature.

11. The electronic device of claim 10, wherein determining the multi-level theme classifications of the object comprises:
   determining a core entity in the entity set; and
   determining a theme type corresponding to the core entity based on the knowledge base.

12. The electronic device of claim 11, wherein determining the multi-level theme classifications of the object further comprises:
   obtaining a first feature by weighting the merged feature using a vector of the core entity;
   obtaining a second feature by weighting the merged feature using a vector of the theme type; and
   obtaining the multi-level theme classifications of the object based on the first feature and the second feature.

13. The electronic device of claim 8, wherein obtaining the negative example vector comprises:
   counting word frequencies of words in text descriptions of all entities of the entity set in the pre-established knowledge base; and
   randomly selecting a word sequence used as the negative example vector based on the word frequency of each word.

14. The electronic device of claim 8, wherein the method further comprises:
   determining a theme inference of the object based on the text information; and
   determining a merged theme of the object based on the theme classification and the theme inference of the object.

15. A non-transitory computer readable storage medium having a computer program stored thereon, wherein when the computer program is executed by a processor, the processor is caused to implement a theme classification method based on multimodality, the method comprising:
   obtaining, digitally, text information of an object to be classified by using a plurality of computer implemented text-extraction methods, and extracting, digitally, non-text information of the object, wherein the non-text information comprises at least one of visual information and audio information;
   determining, digitally, an entity set of the text information by performing entity linking on the text information based on a pre-established knowledge base, wherein performing entity linking comprises linking one or more entities involved in the text based on the pre-established knowledge base;
   extracting a text feature of the object based on the text information and the entity set;
   extracting a non-text feature of the object based on the non-text information; and
   determining a theme classification of the object based on the text feature and the non-text feature of the object,
   wherein the entity set comprises a plurality of entities involved in the text information, and the method further comprises: for each entity in the entity set,
   obtaining a positive example vector based on a text description for the entity and an object related to the entity in the knowledge base;
   obtaining a negative example vector based on a randomly sampled text and a randomly sampled object; and
   training a vector generation model of the entity based on positive example vectors and negative example vectors, wherein a ratio of a number of the positive example vectors to a number of the negative example vectors is equal to a predetermined ratio.

16. The non-transitory computer readable storage medium of claim 15, wherein obtaining the text information of the object comprises:
   obtaining an image text by performing optical character recognition for the visual information;
   obtaining a speech text by performing automatic speech recognition for the audio information;
   obtaining a character text based on a title and a bullet screen of the object; and
   obtaining the text information by merging the image text, the speech text, and the character text.

17. The non-transitory computer readable storage medium of claim 15, wherein determining the theme classification of the object comprises:
   based on the visual information and the audio information, extracting a visual feature and an audio feature by an attention-based long-short term memory network;
   obtaining a merged feature of the object by merging the visual feature, the audio feature, and the text feature; and
   determining multi-level theme classifications of the object based on the merged feature.

18. The non-transitory computer readable storage medium of claim 17, wherein determining the multi-level theme classifications of the object comprises:
   determining a core entity in the entity set; and
   determining a theme type corresponding to the core entity based on the knowledge base.

* * * * *